Aug. 21, 1962 L. BÄMPFER 3,049,987
DOMESTIC MACHINE FOR PRODUCING EXTRACTS OF
COFFEE, TEA AND THE LIKE
Filed Dec. 22, 1958

INVENTOR.
Ludwig Bämpfer
BY
Watson, Cole, Grindle & Watson
Attys.

United States Patent Office 3,049,987
Patented Aug. 21, 1962

3,049,987
DOMESTIC MACHINE FOR PRODUCING EXTRACTS OF COFFEE, TEA AND THE LIKE
Ludwig Bämpfer, Karlsruher Strasse 52,
Schwenningen (Neckar), Germany
Filed Dec. 22, 1958, Ser. No. 782,112
Claims priority, application Germany Dec. 20, 1957
4 Claims. (Cl. 99—281)

The invention relates to a household apparatus for producing or brewing coffee, tea and the like with boiling water as an improvement over the type of device shown in the patent to Brandle No. 2,846,938 of August 12, 1958. This apparatus operates automatically in that after the filling of cold water into the container, the heating will take place and when emptied to a definite amount the heating will automatically cease. For this purpose a diaphragm operated switch is provided and this diaphragm is actuated by the weight of the column of water in the cold water container to thereby open the circuit of the heating current. After the filling of the cold water in the cold water container also air contained in the water is also filled in and reaches the diaphragm of the switch to thus build up an air cushion under the diaphragm which will provide an elastic force. Since however the amount of the air in the refilled cold water is of a varying amount, this air cushion is of a varying size and also its pressure on the diaphragm may change. This pressure adds up to its own elastic force of the diaphragm so that this is not always a measure of the height of water in the cold water container. Therefore it follows that the closure does not always take place at a particular time.

To overcome this objection the diaphragm box is, according to the invention, provided with an air vent tube which leads to above the maximum water level in the cold water container. This diaphragm box air vent tube extends upwards through the cold water container and is preferably connected with the riser tube of the through-flow heater.

An embodiment of the invention applied to a coffee brewing machine is illustrated by way of example in the accompanying drawing, in which.

Figure 1:
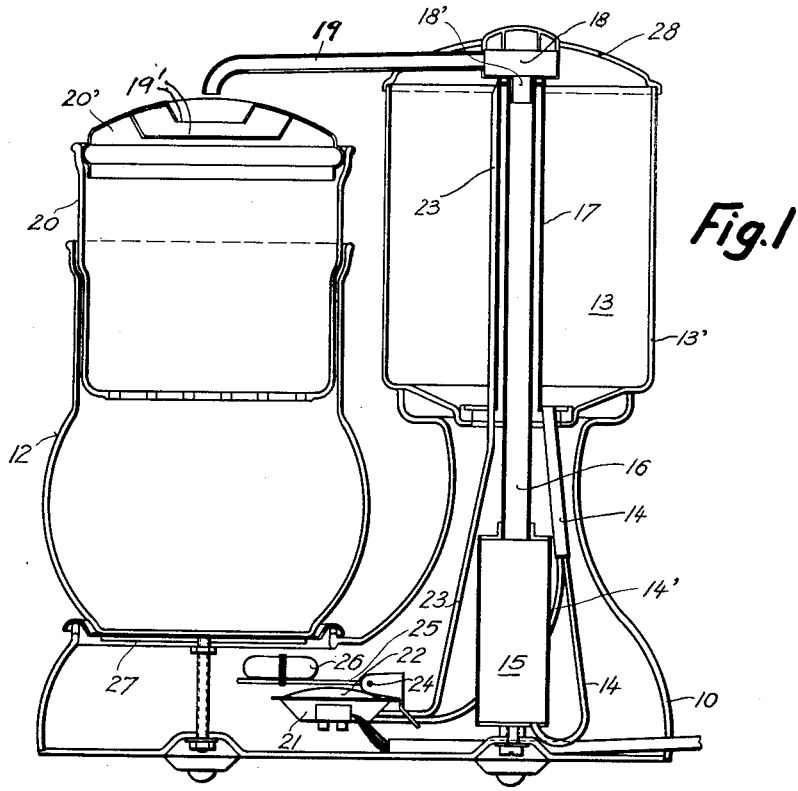
FIG. 1 is a longitudinal section.
Figure 2:
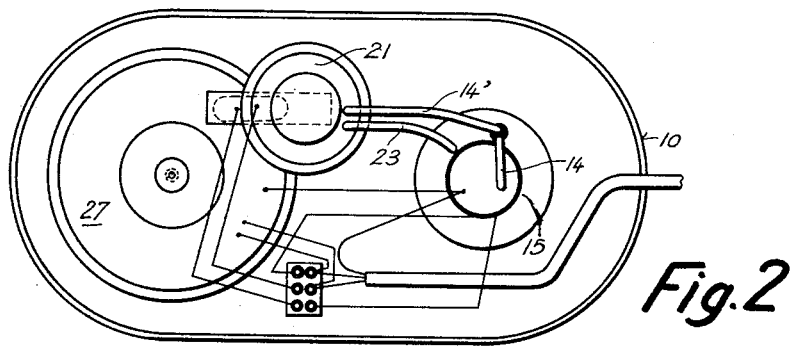
FIG. 2 is a bottom plan view of the machine after removal of the bottom plate.

10 designates the base of the coffee machine on which the beverage receptacle 12 and the cold water container 13 are placed. Below the cold water container a through-flow heater 15 is arranged inside the base 10. This heater has a riser tube 16 extending axially upwards through the cold water container 13 to above the upper edge of its side wall 13'. Inside the cold water container 13 this riser tube 16 is surrounded with clearance by a jacket tube 17 which is tightly connected to the bottom of the container 13. An outlet tube 14 leads from the bottom of the container 13 and terminates in the bottom of the through-flow heater 15. A tube 14' branches from the tube 14 and leads into the diaphragm box or casing 21 which is covered by a diaphragm 22. The base 10 has a platform in which a heating plate 27 is suspended. The beverage receptacle which is to receive the coffee extract is placed on this heating plate. A brewing vessel 20, closed by a lid 20', and with feed apertures 19', is placed in the upper end of the beverage receptacle 12. Above this brewing vessel a swivel conduit tube 19 is arranged which is fixed at one end to a cap 18 provided with a feed socket 18' rotatably fitting to the riser tube 16 of the through-flow heater 14. A cover 28 as described in Patent No. 2,846,938 provided with a radial slot for the swivel conduit tube 19 and a circular aperture for admitting the rotary cap 18 on the swivel conduit tube 19, closes the cold water container at the top.

The above-described construction of the domestic coffee machine is known and disclosed in the specification of the Swiss Patent No. 320,252, identical with U.S. Patent No. 2,846,938.

Now according to the invention, a one-armed lever 25 bears against the diaphragm 22 on the box 21 to which it is connected at one end by a hinge 24 whereas it carries a mercury switch 26 at its other end. Electric lead wires, not shown in the drawing, are connected up with this switch and supply current to the through-flow heater.

So as to avoid and render harmless accumulations of air under the diaphragm, produced by the air contained in the water introduced into the cold water container, an air vent tube 23 extends from the diaphragm box 21 and, in the present form of construction, passes upwards through the bottom of the cold water container 13 alongside the jacket tube 17 surrounding the riser tube 16 of the through-flow heater 15 to within a short distance below the cap 18 of the swivel conduit tube 19. Consequently the outlet of this air vent tube 23 can never be below the maximum liquid level in the cold water container.

The domestic coffee brewing machine operates in the following manner:

After removal of the cover 28 from the cold water container 13, this latter is filled with water. The water flows both through the tube 14 and also through the branch tube 14', on the one hand into the through-flow heater 15 and on the other hand into the diaphragm box 21. The diaphragm 22 is bulged upwards by the pressure of the liquid column in the cold water container 13 and the tube 14' and swings upwards the one-armed lever 25 which carries with it the mercury switch 26, thereby closing the heating current circuit for the through-flow heater so that this commences to heat up. The hot water then rises in the riser tube 16 into the cap 18 of the swivel conduit tube 19 through which it flows into the brewing vessel 20. It here extracts the coffee or tea and the finished beverage drips into the beverage receptacle 12 from which it can be taken as required. The capacity of the cold water container is preferably the same as that of the beverage receptacle so that when the contents of the cold water container are used up the beverage receptacle will be full. The water column in the cold water container will then have sunk into the tube 14 and the diaphragm 22, which always functions correctly due to the escapement of air, will again bend inwards and switch off the heating current to the through-flow heater, thereby preventing any possible damage. The heating plate 27 under the beverage receptacle 12 is only provided for keeping the beverage warm and remains switched on as long as the machine is in use.

I claim:

1. A machine for brewing extracts from coffee, tea and the like comprising a water container, a heater below the water container and having a riser tube communicating with the water container, a brewing vessel with a perforated bottom and beverage receptacle formed as a unit, one mounted on the other and provided adjacent the container, electric heating means for the through-flow heater, an electric switch connected with the heating means, a tube connected to the water container at the top of the riser tube and projecting over the top of the brewing vessel and a casing with a diaphragm therein and connected to be acted on by a liquid column in the water container to control the electric switch which latter is switched on and off according to the amount of liquid in the cold water container, and an air vent tube connected to the casing and extending to the top of the cold water container to prevent accumulation of the air under the diaphragm.

2. Device according to claim 1, wherein the air vent conduit is connected to a riser tube of the through-flow heater.

3. A machine for brewing extracts from coffee, tea and the like comprising a water container, a heater for the water container and having electric heating means therein, a brewing vessel having a perforated bottom and adjacent the water container of substantially equal volume, an electric switch connected with the heating means to control the electric current to the heating means, a tube connected to the water container and projecting over the top of the brewing vessel, a casing with a diaphragm connected to control the switch and an air vent tube connected to the casing and extending into the water container and extending near the top thereof to prevent accumulation of air under the diaphragm.

4. A machine for brewing extracts from coffee, tea and the like comprising a water container, a heater for the water container and having electric heating means therein, a brewing vessel having a perforated bottom and adjacent the water container of substantially equal volume, an electric switch connected with the heating means to control the electric current to the heating means, a tube connected to the water container and projecting over the top of the brewing vessel, a casing with a diaphragm connected to control the switch and a mercury switch connected to be operated by the diaphragm to shut off the current to the heating means, and an air vent tube connected to the casing and extending into the water container and extends near the top thereof to prevent accumulation of air under the diaphragm.

References Cited in the file of this patent
UNITED STATES PATENTS

| | | |
|---|---|---|
| 1,515,800 | Storey | Nov. 18, 1924 |
| 1,976,196 | Sawyer | Oct. 9, 1934 |
| 2,088,491 | Smith | July 27, 1937 |
| 2,269,111 | Jepson | Jan. 6, 1942 |
| 2,846,938 | Brandl | Aug. 12, 1958 |